United States Patent [19]

Owen et al.

[11] Patent Number: 4,663,639

[45] **Date of Patent: * May 5, 1987**

[54] PRINTER

[75] Inventors: David Owen; Colin G. McLaine, both of Cleveland, England

[73] Assignee: Imperial Chemical Industries plc, London, England

[ * ] Notice: The portion of the term of this patent subsequent to Oct. 22, 2002 has been disclaimed.

[21] Appl. No.: 716,248

[22] Filed: Mar. 26, 1985

Related U.S. Application Data

[63] Continuation-in-part of Ser. No. 589,221, Mar. 13, 1984, Pat. No. 4,549,243.

[30] Foreign Application Priority Data

| | | | |
|---|---|---|---|
| Mar. 25, 1983 | [GB] | United Kingdom | 8308346 |
| May 20, 1983 | [GB] | United Kingdom | 8313959 |
| Aug. 18, 1983 | [GB] | United Kingdom | 8322308 |
| Oct. 5, 1983 | [GB] | United Kingdom | 8326666 |
| Mar. 7, 1984 | [EP] | European Pat. Off. | 84.301502.5 |

[51] Int. Cl.4 .................... G01D 15/16; G01D 15/18

[52] U.S. Cl. .................... 346/140 R; 346/75

[58] Field of Search .......... 346/30, 75, 140 R, 140 IJ, 346/140 PD, 141; 361/228

[56] References Cited

U.S. PATENT DOCUMENTS

| | | | |
|---|---|---|---|
| 1,097,131 | 5/1914 | Kitsee | 346/140 PD |
| 3,060,429 | 10/1962 | Winston | 346/140 IJ |
| 3,543,279 | 11/1970 | Rempel et al. | 346/141 |
| 3,771,166 | 11/1973 | Tullos | 346/140 R |
| 3,778,840 | 12/1973 | Rahl | 346/30 |
| 3,824,603 | 7/1974 | Bates et al. | 346/141 |
| 4,549,243 | 10/1985 | Owen et al. | 361/228 |

*Primary Examiner*—George H. Miller, Jr.
*Attorney, Agent, or Firm*—Cushman, Darby & Cushman

[57] ABSTRACT

Apparatus for dispensing a liquid e.g. for graphic work, having a nozzle to which a high potential is applied from a high voltage generator. The nozzle has a porous wick e.g. a felt- or fibre- tip extending therefrom. The liquid reservoir and wick may be a cartridge, e.g. a felt-tip graphic marker. The apparatus may be a self-contained hand-held unit which can be 'earthed' via the user's hand. Alternatively the apparatus can be in the form of a printer controlled by a control unit—e.g. a computer graphics plotter.

21 Claims, 9 Drawing Figures

PRINTER

Figure 1:
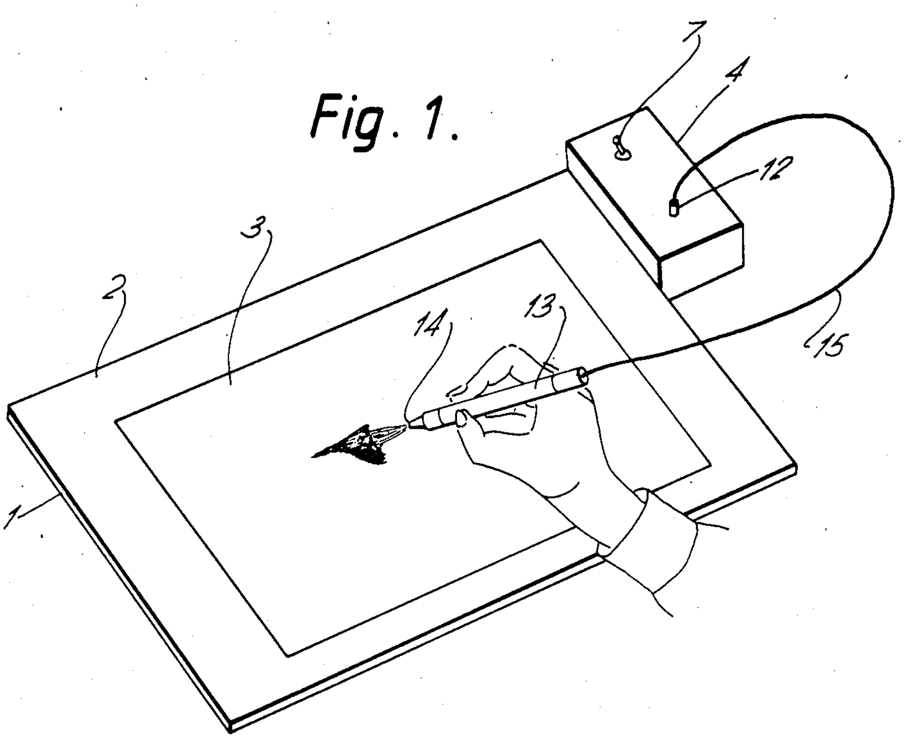

This application is a continuation-in-part of our application Ser. No. 589,221 filed Mar. 13, 1984, now U.S. Pat. No. 4,549,243.

This invention relates to an applicator for supplying a liquid to a substrate, and in particular to an applicator for applications such as graphic work where it is desired that the region to which the liquid is applied can be precisely controlled.

We have devised an applicator arrangement wherein the liquid is applied as a fine stream or spray.

One form of spray applicator that has been used heretofore for graphic work is the so-called "air brush"—wherein an applicator having a body member designed to be held between the digits of the human hand is provided with a nozzle through which the liquid may be dispensed from a reservoir as a spray. The applicator is connected, generally via a flexible tube, to a source of propellant for atomising the liquid as a spray from the nozzle. The propellant source is typically an air compressor or a canister of liquified, compressed, gas. Suitable air compressors tend to be relatively bulky, noisy and expensive while canisters of propellant become exhausted relatively quickly thereby presenting considerable operating expense. Such air-brushes, although somewhat cumbersome, are however widely used by those engaged in graphic work, e.g. designers, artists, signwriters, model makers, and decorative coach workers.

In the present invention the stream of liquid is provided electrostatically. It is known, for example from U.S. Pat. No. 4,356,528, that if an electrical field of suitably high strength is established at a liquid supply nozzle, the liquid can by drawn away from the nozzle as one or more fine ligaments of electrically charged liquid. At a certain distance from the nozzle the ligament or ligaments break up to form a divergent spray of electrically charged liquid droplets. The ligament length depends on the applied field strength and on the electrical and physical characteristics of the liquid particularly its resistivity, surface tension, and viscosity. For non-aqueous liquids such as spirit based inks with an applied voltage of the order of 1 to 15 kV, the ligament length is usually no more than about 15 mm and is often less than 10 mm.

In the arrangement described in that U.S. patent, the applied potential effects atomisation of liquid that is flowing, e.g. dripping, from the nozzle, e.g. by gravity flow.

It has also been suggested in "Naturwissenschaften" 40 (1953) page 337 that the application of a sufficient potential can effect atomisation of a liquid supported by surface tension in an upwardly directed nozzle of capillary dimensions.

Printers utilising this concept of ligament formation to transfer ink from the nozzle to a substrate have been described in U.S. Pat. Nos. 3,887,928 and 3,964,498. In those references the electrical field was generated between a nozzle and a perforate member so that the resultant ink stream was projected through the perforate member on to the substrate. The nozzle employed in those references was a small bore tube, typically of internal diameter in the range 0.2 to 0.35 mm.

We have found that that type of printer suffers from two serious disadvantages: firstly the nozzle is liable to blockage, for example as a result of the ink drying out and depositing solid ink pigment particles in the fine nozzle; also, unless the tip configuration is carefully precision engineered, as disclosed in the aforesaid U.S. Pat. Nos. 3,887,928 and 3,968,498, there is a risk of jet instability and branching, forming a plurality of ligaments, with consequent non-uniformity and blurring of a line trace. Such precision engineering inevitably means that satisfactory nozzles are relatively expensive and are easily damaged.

Furthermore, in the form of printer disclosed in the aforesaid U.S. Pat. Nos. 3,887,928 and 3,968,498, the electrical field causing ligament formation is established between the nozzle and a perforate plate through which the ink stream is projected on to the substrate. Unless the nozzle is accurately centred with respect to the aperture in the plate, the ink stream is liable to be deflected by the perforated plate.

In the present invention there is employed an alternative nozzle configuration viz a nozzle having a porous wick, typically of the type commonly employed in felt- or fibre- tip graphic markers, extending therefrom.

Accordingly the present invention provides apparatus for dispensing a liquid comprising (i) nozzle having a porous wick extending therefrom,
(ii) liquid supply to said wick,
(iii) means to support said nozzle, and
(iv) means to apply to said wick a sufficiently large electrical potential, relative to earth, that, when the tip of said wick is positioned at a distance within the range 5 to 20 mm from an earthed surface, sufficient electrical gradient is provided at the tip of said wick to draw a ligament of said liquid away from said wick.

The means to support the nozzle preferably comprises a body member from which the wick protrudes: however the body may have an open ended extension providing a shroud round, but spaced from, the wick to protect the end thereof from damage.

The applicator body member is preferably constructed from an electrically insulating material, e.g. a suitable plastics material but, as mentioned hereinafter, in some cases its surface preferably has an electrically conductive portion.

The applicator nozzle has a porous wick, protruding therefrom. The types of porous felt or plastic pads or fibre bundles widely used in graphic implements such as felt- or fibre-tip markers or felt- or fibre-tip pens, for example of the type described in U.K. Pat. No. 628,350, are eminently suitable as the wick material.

The cross-sectional area of the porous wick can be up to 1 cm square but preferably is in the range 0.02 to 0.2 $cm^2$.

The wick configuration may have some effect on the nature of the electrical field at the tip of the wick and hence on the shape of the liquid stream produced: preferably the wick has a pointed, hemispherical, or "bullet head" configuration. It is preferred that the tip of the wick has at least one radius of curvature below 5 mm, particularly below 2 mm.

The wick configuration may affect the volumetric flow of liquid from the tip of the wick when the potential is applied. To vary the flow rate the nozzle and wick may be demountable from the applicator body so that it can be exchanged for another nozzle and wick of differing configuration. The viscosity of the liquid will also affect the volumetric flow rate.

The means for supplying the liquid to the wick will generally comprise of liquid reservoir and a fluid connection from the reservoir to the nozzle. The reservoir may comprise a cartridge, which may be refillable, which can be disconnected from the applicator body so that the reservoir can be replaced. Where the reservoir is part of the applicator body, feed of liquid to the nozzle is preferably effected by capillary action, e.g. by the wick of porous material extending from the nozzle to the reservoir. The reservoir may be a wad of absorbent material, e.g. felt or wadding impregnated with the liquid, within a suitable casing.

Alternatively the reservoir may be remote from the applicator body and connected thereto by a flexible tube. In this case the reservoir may be pressurised to supply the liquid to the wick. Alternatively a pump may be used to supply liquid to the wick.

It will be appreciated however that, if the supply of liquid is pressurised, or a pump is employed, the pressure on the liquid must be insufficient to overcome the forces, e.g. surface tension forces, preventing flow of liquid from the wick when the high potential is not applied.

In one preferred form of the invention the reservoir, nozzle and wick constitute a single cartridge unit which can be exchanged for another cartridge. The cartridge in such cases is conveniently a felt- or fibre-tip applicator, for example a felt- or fibre-tip marker of the type widely used in graphic work.

In this form of the invention it is necessary that the body is provided with a contact to apply the high potential from a high voltage generator (which may be within the applicator body or remote therefrom) to the cartridge. If the cartridge is of an electrically conductive material, then the high potential is conducted either directly to the nozzle or through the cartridge walls to the liquid therein and thence, by conduction through the liquid, to the nozzle and thus to the wick. Even where the cartridge is manufactured from a poor conductor, in many cases a sufficiently high potential can be applied to the nozzle via conduction over the cartridge surface. However it is preferred in such a case to provide an electrical connection directly to the nozzle or to the liquid within the cartridge. Where the liquid reservoir is liquid absorbed on a suitable wad within the cartridge, such a connection can be effected by inserting a suitable conductive stud, e.g. a metal drawing pin, through the wall of the cartridge so that the stud contacts the liquid impregnated wad.

Therefore in accordance with a further aspect of the invention, there is provided apparatus for use in the dispensing of a liquid from a cartridge having a casing enclosing a reservoir of the liquid and a nozzle having a porous wick extending therefrom, comprising (i) a body adapted to receive said cartridge with the tip of the wick thereof projecting therefrom, and
(ii) means to apply a sufficiently large electrical potential, relative to earth, to said cartridge is fitted to said body, that, when the tip of said wick is positioned at a distance within the range 5 to 20 mm from an earthed surface, sufficient electrical gradient is provided at the tip of said wick to draw a ligament of said liquid away from said wick.

In a preferred form of the invention, the body member is adapted to receive cartridges of more than one shape and/or size. To enable such cartridges to be employed, there may be provided one or more adaptor components which are fitted as necessary to the body member to locate and/or hold different cartridges in position and/or to enable adequate electrical connection to the differing cartridges to be made.

The apparatus of the invention includes means for applying a high potential, relative to earth, to the wick or to a contact which, when a cartridge containing the wick is connected to the body member, enables a high potential to be applied to the wick.

In one form of the invention the apparatus may be used as a printing head for a printer where a mark is applied from an applicator on to a substrate at a particular location determined by signals from a control unit.

Examples of such printers include chart recorders, line printers and flat bed plotters. Such printers are characterised by means for effecting relative movement between an applicator and the substrate in a plane perpendicular to the perpendicular from the applicator to the substrate so that the applicator can be moved, relative to the substrate, to the position at which a mark on the substrate is desired. The applicator may make a mark continuously as it is moved relative to the substrate, thereby tracing out a line on the substrate or may make intermittent marks e.g. giving dots, dashes, or discrete characters.

The control unit may be a measuring instrument producing an output signal indicative of the parameter being measured or may be a more complex unit such as a computer, by which term we include related hardware such as micro-processors. The invention is of particular utility as a printer for portraying computer graphics.

The signal or signals from the control unit include signals to determine the co-ordinates at which it is desired to effect the mark from the applicator. The means effecting the relative movement of the applicator relative to the substrate may include a suitable arm, carrying the applicator, driven by a motor or motors which may be electrically, pneumatically, or hydraulically powered. In some cases the substrate may be moved in one direction, e.g. continuously, or intermittently, as in a conventional linear or disc chart recorder or a line printer, while the applicator is moved, under the control of the control unit, in a direction transverse to the direction of substrate movement.

Alternatively the substrate may be stationary and the applicator moved to the appropriate position thereover.

As mentioned hereinafter means may also be provided for effecting relative movement in the third dimension, ie. to vary the distance of the tip of the wick from the substrate in response to signals from the control unit.

In another form of the invention the arm is human and the control unit is the brain. Thus in this form of the invention the applicator body is elongated and is of such shape and size that it can be held in the human hand. To this end the body preferably has at least one cross-sectional dimension below 10 cm. Preferably the maximum cross-sectional dimension is below 10 cm. For fine scale work the applicator body is preferably shaped so that it may be held between the digits of the human hand. Thus it may be held between the thumb and one or more fingers or between adjacent fingers depending on the user's preference. To this end the applicator body preferably has at least one cross-sectional dimension below 4 cm, particularly within the range 0.5 to 3 cm. The total length of the applicator body is preferably between 4 and 25 cm, particularly between 5 and 20 cm. It is preferred that the total length of the applicator is below 25 cm.

The apparatus of the invention includes means for applying to the nozzle, or to a cartridge containing the nozzle, a high potential relative to earth.

The high potential is provided by a suitable high voltage generator which may be mains powered. It is however preferred, in the case of a hand-held applicator, that the generator is bettery powered or is a piezoelectric generator operated by movement of a suitable component, e.g. a push button or trigger.

The generator may be mounted in or on the body member, or may be remote therefrom. Where a battery powered generator is mounted in the body member, it is preferred that the body member also accommodates the necessary batteries.

Where the generator is remote from the body member or is powered from a source remote from the body member, an electrical connection, e.g. a flexible lead, is required from the remote generator, or power source, to the body member. Where the liquid reservoir is also remote from the body member, the high voltage from a remote generator may be applied to the liquid in the reservoir and the potential applied to the nozzle from the liquid in the reservoir via conduction through the liquid in the fluid connection from the reservoir to the body member.

The generator may be of the type giving a steady D.C. voltage, particularly where the generator is mains powered. Alternatively, and preferably in the case of a hand held applicator in which the generator is within the applicator body, it may be of the type employing a transformer to produce high voltage pulses at frequency of from 1 Hz to 20 kHz. Such a generator should be provided with a rectifier to avoid pulses of opposite polarity, e.g. as obtained as a result of "ringing", from being applied to the tip of the wick. Preferably the high voltage circuit has sufficient capacitance that, during use, the desired electrical gradient at the tip of the wick is maintained between pulses but on the other hand should have a low stored energy, preferably less 10 mJ, so that no safety hazard is presented to the user for example by accidental contact of the user with the nozzle or wick or on contact thereof with an earthed surface.

The appropriate capacitance may in some cases be provided by the capacitance between the liquid reservoir and/or its casing and an earthed member, e.g. the user in the case of a hand held applicator, rather than by a discrete capacitor component.

For many applications the applicator will be used with the tip of the wick at a distance of 1 to 100 mm from a substrate.

It is necessary that the high potential applied to the tip of the wick is sufficient that, when said tip is at a distance within the range 5 to 20 mm from an earthed substrate, the liquid is drawn away from the tip as a ligament. It will be appreciated that the applied potential will generally be such as to enable discharge of the liquid from the wick to occur over a range of distances of the tip of the wick from the substrate. The potential required at the tip of the wick to effect such liquid discharge will depend on the nature of the liquid, e.g. its resistivity and the wick configuration but will generally be within the range 1 to 25 kV, in particular between 2 and 20 kV, and may be negative, or, preferably, positive with respect to earth.

In general the high voltage generator should be capable of applying a sufficient potential, relative to earth, to the wick that, the liquid is drawn away from the wick as a ligament when the tip of the wick positioned 20 mm from an earthed surface.

Paper, thin card, and metals are suitable substrates, even if they already have a layer of paint or lacquer thereon. Thus hand-held apparatus in accordance with the invention may be used for applications such as coach-lining, touch-up painting, workpieces such as automobiles as well as normal graphic art work.

Insulating materials, such as plastic films or sheets are in general not suitable as substrates. Thus the substrate should have sufficient surface and/or volume conductivity that there is rapid dissipation, to earth of the charge transferred to the substrate by the charged liquid alighting thereon.

The electrical current flowing as a result of the transfer of the charged liquid from the wick to the substrate will generally be within the range 1 to 5000, and usually below 1000, nA. It is preferred that the substrate has sufficient surface and/or volume conductivity that the resistance to earth from the region of the substrate surface nearest to the wick tip is less than 10 GΩ, particularly less than 1 GΩ.

For many applications the substrate will be supported on a backing member, e.g. a work top such as a drawing board, or, in the case of a printer, a plate or roller. Providing this backing member is not an insulator sufficient charge dissipation to earth can normally occur therethrough. Preferably the backing member is made from wood, metal, graphite filled plastics material, or a non-conductive material support provided with a conductive surface layer e.g. aluminium foil or metallised plastics film fastened, e.g. laminated, to the support.

An electrical connection, to form a return path, is required between the generator and the substrate. Where the generator and/or its power source, is remote from the body member this connection will, normally be provided by a direct connection, or via the earth. In the case of a hand-held applicator where the generator is mounted within the body member, sufficient electrical continuity to earth can normally be provided by conduction through the user's hand holding the body member thus obviating the need for an electrical lead from the generator to earth. Conduction from the generator to earth via the user can be facilitated by providing a conductive portion on the body member surface, which portion is connected to the generator and to which contact is normally made by the user's hand during use.

Where a non-conducting substrate backing member is employed, the path to earth from the substrate may be provided by a conductive member contacting the substrate, preferably near to the substrate region nearest to the wick tip.

The liquid typically has a viscosity in the range $10^{-4}$ to $10^{-1}$ Pa.S and a surface tension of $10^{-2}$ to $10^{-1}$ $N.m^{-1}$. While aqueous liquids, e.g. Indian ink, can be used, they tend to produce a succession of droplets rather than a continuous stream of liquid from the wick. It is preferred to employ non-aqueous liquids, for example spirit based inks, having a resistivity above $10^4$, and in particular between $10^7$ and $10^{12}$, ohm. cm.

In the present invention the nature, i.e. breadth and intensity, of the liquid deposit made by the applicator depends on a number of factors including the nature of the liquid and substrate, the wick configuration, the spacing of the wick tip from the substrate, the magnitude of the applied potential and the duration of the application of the potential while the applicator is at the desired position.

In the case of a printer actuated by signals from a control unit, in addition to signals determining the positioning of the applicator relative to the substrate, the control unit may provide signals which determine the duration of the applied voltage, the wick tip/substrate spacing and the magnitude of the high potential.

As mentioned hereinbefore, the ligament drawn away from the wick by the electrical field will break up into a divergent spray of fine droplets, typically of diameter 10–30 μm, at a certain distance from the wick tip. Thus when the tip is relatively close, e.g. 1 to 10 mm, to the substrate, a relatively fine deposit, typically of width less than 1 mm, often less than 0.5 mm, is produced by the ligament. When using liquids leaving a visually distinctive mark on the substrate this enables lines or characters to be drawn. If however the tip/substrate distance is greater than the ligament length, for example if the tip/substrate distance is 15 to 50 mm, the ligament will break up to form a divergent spray. This is of use in those applications where it is desired to apply the liquid all over an area rather than merely as a line or series of dots, or dashes. While this can be done in conventional printers by drawing a succession of close spaced lines, or lines of characters, over the desired area, this mode of filling in an area tends to be relatively slow.

Thus by increasing the tip/substrate spacing so that the ligament breaks up into a divergent droplet spray before it contacts the substrate, the applicator can be used to apply the liquid to an area rather than produce a narrow trace. Typically with the wick tip 25 mm from the substrate, without effecting any movement of the applicator relative to the substrate, a circular deposit of diameter 3 mm or more can be produced. The size of the deposit will depend on the nature of the wick liquid, and substrate, and applied potential: in many cases deposits of diameter of the order of 1 cm or more can be obtained with a wick tip/substrate spacing of 25 mm. The conductivity of the substrate has an effect on the width of the mark: poorly conducting substrates tend to give broader marks than substrates that are good conductors.

When a wick tip with a high potential applied thereto is brought close to an earthed substrate, spark discharges from the tip to the substrate may occur instead of, or as well as the formation of the jet of liquid. It is preferred that the field strength at the wick tip is such that the maximum distance of the of the wick tip from an earthed substrate at which spark discharges occur is less than 5 mm. At greater distances the field strength is insufficient to cause spark discharges but is sufficient to draw the liquid away from the wick as a ligament that, provided the wick tip/substrate distance is sufficient, atomises as a spray of fine, electrically charged, droplets. As the wick tip is moved further away from the substrate, eventually the field between the wick tip and the substrate will drop below that necessary to cause ligament formation and atomisation. We prefer that the field strength at the wick tip is such that the distance at which spraying ceases is not more than 30 cm, particularly not more than 15 cm.

It is seen that, for a given applied potential, liquid deposition can be caused to stop by moving the wick tip a sufficient distance away from the substrate: also, when the wick tip is in contact with the substrate, liquid can be deposited thereon by moving the nozzle, in contact with the substrate, relative thereto; i.e. in the manner of a conventional marking or writing implement.

Provision may be made for varying the potential applied to the wick, for example by varying the generator output, e.g. the frequency of production of high voltage pulses and/or their magnitude. This is advantageous since it enables a fine, narrow, deposit to be produced, by using relatively low voltages, e.g. 1–5 kV, when the wick tip is close to the substrate: by increasing the potential, e.g. to 8–15 kV, a broader spray can be obtained with the wick tip at greater distances from the substrate. If the higher potential were to be applied with the wick tip close to the earthed surface, a fine enough deposit might not be obtainable because of the occurrence of spark discharges. Therefore if the apparatus is arranged so that the distance of the wick tip from the substrate is variable, it is preferred that provision is also made for varying the applied potential so that such spark discharges can be avoided.

The magnitude of the applied potential tends to affect the volumetric flow rate of liquid from the wick: increasing the potential increases the flow rate. This is of particular utility in relation to chart recorders where, on occasions, a rapid movement of the applicator relative to the substrate takes place to record a rapidly changing parameter. By increasing the voltage when the rate of relative movement increases, the intensity of the trace on the substrate may be rendered more uniform.

For reasons not at present understood, if the applied potential is reduced below a certain level (depending on the nature of the wick and liquid and the wick tip/substrate spacing), a discontinuous rather than a continuous liquid stream may be produced. Hence by effecting movement of the applicator relative to the substrate at such applied potentials, dotted rather than continuous deposits can be produced.

Discontinuous deposits can also be effected by switching the high potential on and off. Where the magnitude of the potential is such that switching thereof presents undue problems, the high potential may be provided as a pulse, or train of pulses from a suitable generator via a step-up transformer. The length of such a pulse train can be determined by switching lower voltages in the primary circuit of the step-up transformer. However in this case, where it is desired to provide for discontinuous operation, the applicator should have a low capacitance so that formation of the ink stream does not continue for any significant time after cessation of supply of the high potential from the generator.

Control of the formation of the liquid stream may also be achieved by the technique described in aforesaid U.S. Pat. No. 3,887,928 by disposing a control electrode, preferably a ring, adjacent the wick tip but spaced therefrom. By varying the potential on the control electrode, the liquid stream can be switched on and off. This is of particular utility in printers under the control of a control unit where the control electrode potential may be varied in response to signals from the control unit. Alternatively a switching action may be achieved by moving the position of the control electrode relative to the wick tip, again, where appropriate, in response to signals from a control unit.

In the case of a hand-held applicator, a switch will normally be provided to switch the high potential applied to the nozzle on and off. This switch may be, for example, an electronically operated touch sensor switch or a push button or slide switch, provided on the body member or may be a switch, e.g. foot operated, remote from the body member.

In a hand-held applicator the high voltage generator will generally be powered by a relatively low voltage source, e.g. the mains or batteries, and it is preferred that the switch is located in the low voltage circuit.

Where the switch is hand operated the portion of the switch contacted by the user during spraying may be electrically conductive and connected to the generator in order to facilitate the earth connection of the generator.

It will be appreciated that when liquid deposition is taking place, there will be a reduction in the potential difference between the wick tip and earth from that potential difference between the wick tip and earth that exists when no deposition is taking place, i.e. when the electrical gradient at the wick tip is insufficient to cause ligament formation. This reduction results from a number of factors:

(i) the impedance of the return path from the earth to the generator. Where this impedance is low the effect on the potential difference between the wick tip and the substrate may be insignificant. However where the return path has a significant impedance, e.g. where the workpiece has a relatively low conductance and/or the return path includes conduction through the user, the potential difference across the return path, and hence the reduction in potential difference between the wick tip and workpiece may be significant.

(ii) the impedance between the high voltage generator and the wick tip. A significant potential difference reduction between the wick tip and workpiece may occur if this impedance is high, for example where the high voltage is applied to the wick tip from the generator via conduction over the surface or through a cartridge made of a poor conductor.

(iii) the impedance of the leakage return path from the wick tip to the generator. This impedance acts as a shunt to the current corresponding to the stream of charged liquid and so may result in a significant potential difference reduction between the wick tip and substrate, particularly if the "forward" impedance from the generator to the nozzle is high.

It is preferred that generator output voltage and the aforementioned impedances are such that this reduced potential difference between the wick tip and earth is sufficient, preferably above 1 kV, and in particular above 5 kV, to permit liquid deposition to continue so that deposition is continuous rather that intermittent.

In the case of a printer under the control of a control unit, in some applications it is desirable to make marks of differing colours. The applicator may comprise a number of nozzles each with its own wick ink, and high potential supply. Thus the applicator may comprise a number of cartridges which are together moved, relative to the substrate, to the desired mark location. In this case the signals determining movement of the applicator relative to the substrate should also have a further component or components to adjust the applicator position relative to the substrate to position the selected nozzle at the desired location and to actuate the selected nozzle, i.e. to cause the ink to be transferred therefrom to the substrate.

Alternatively the apparatus may be arranged so that, in response to a signal from the control unit indicative of the colour to be applied, an applicator of the desired colour is transported from a storage location to the desired location.

Masking of the substrate can be achieved by means of an insulating material, e.g. a plastics film, disposed over those parts of the substrate on which a deposit is not desired. Where the mark contacts the substrate it will usually be held firmly in place by the electrostatic charges induced when the applicator is brought near to the mask. Masking can also be achieved by the use of an earthed electrically conductive material placed over the substrate: if the mask is insulated from a substrate e.g. paper or card, of poor conductivity relative to the mask, although the mask may become contaminated by the liquid, the liquid will be repelled in the vicinity of the edges of the mask leaving a portion of the substrate free of liquid deposit not only under the mask but also around the mask edges. Also, with a substrate of relatively poor conductivity, textured effects can be achieved by positioning an earthed, suitably textured, conductive member under the substrate.

An alternative form of mask is an electrode placed over the substrate, but out of contact therewith, with the electrode maintained at sufficient potential to prevent generation of a ligament forming field between the wick tip and mask.

In printing apparatus according to the invention the apparatus may therefore include a masking device which is moved, relative to the substrate, in response to signals from the control unit, to determine the position of such sharp edges. Such a mask can also be used to effect an on/off switching action by moving the mask relative to the wick tip so that the mask is between the wick tip and substrate in the "off" position.

The hand-held apparatus of the present invention is of particular utility for graphic work, particularly using a system wherein a conventional graphic marker, e.g. a felt- or fibre-tip applicator is used as a cartridge in a body member which is preferably self contained in the sense that the body member contains the high voltage generator and, if the latter is electrically powered, rather than of the piezo-electric type, batteries to power the generator. The liquid that may be used include any liquids that may be dispensed by such markers e.g. inks, which are preferably spirit based, lacquers and varnishes.

While of primary application to graphic work, the apparatus of the invention may also be used for the localised application of other products, for example pesticides e.g. on to houseplants; anaesthetics; antiseptics and other pharmaceutical preparations, e.g. for the treatment of wounds or skin blemishes; personal hygiene products; cosmetics; perfumes; demisting liquids; lubricating oils; adhesives; and dry cleaning fluids e.g. grease spot removers.

While the apparatus is normally capable of spraying when held with the wick tip at about 20 mm above an earthed surface, in some cases it may be desired to spray the liquid simply into the atmosphere, e.g. where the liquid is an insecticide, such as a flykiller, or a perfume or air freshener rather than on to a workpiece. For such applications it is necessary that an earthed member, which may in some cases be the user's hand, is sufficiently near to the wick tip to act as a field intensifying electrode as described in aforesaid U.S. Pat. No. 4,356,528. However for such cases it is preferred that an electrode is positioned adjacent to, but spaced from the wick tip, preferably upstream thereof, with an earth connection from said electrode, e.g. via the user. If desired provision may be made for varying the position of this electrode.

The provision of a field intensifying electrode may, in some cases, also be desirable in a graphic implement as it will enable spraying to continue when the wick tip is a considerable distance from the workpiece: this is of benefit if it is desired to apply the liquid to relatively large workpiece areas, e.g. to colour background areas. The field intensifying electrode may also have an effect on the shape of the spray.

It may be desirable to provide a switch, e.g. a push button or slide switch, on the body whereby the electrical connection to the field intensifying electrode to earth may be made or broken. Where connection of the field intensifying electrode to earth is made via the user, the body member may be provided with an electrically conductive portion on its surface connected to the field intensifying electrode: connection of the field intensifying electrode to earth via the user will then be made when the user contacts the electrically conductive portion of the body member surface and will be broken when there is no such contact. Hence by making or breaking the electrical connection between the field intensifying electrode and earth, the field intensifying electrode can be rendered operative or inoperative as desired.

The invention is illustrated by reference to the accompanying drawings in which

Figure 2:
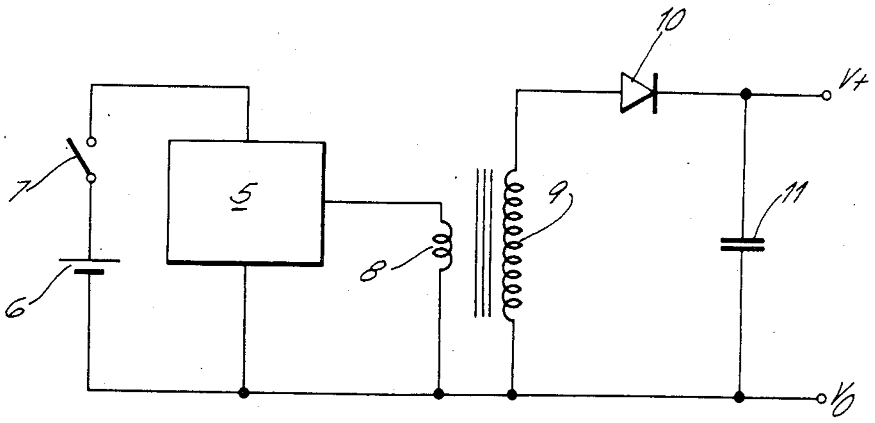
Figure 3:
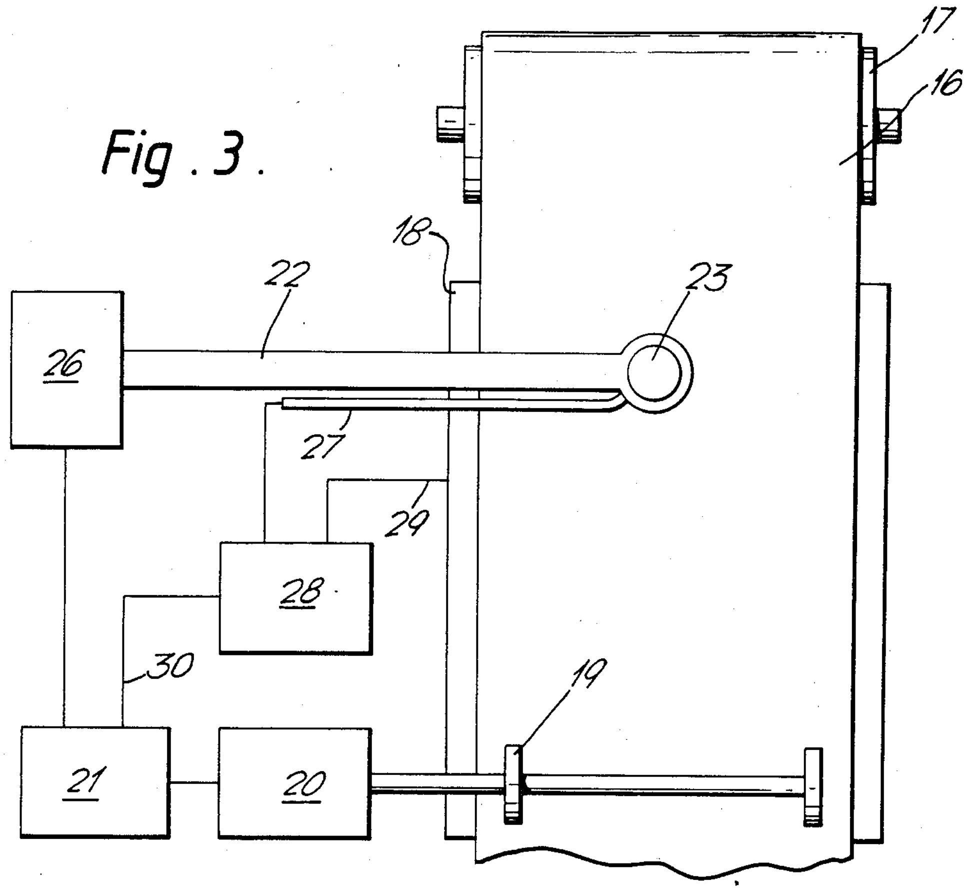
Figure 4:
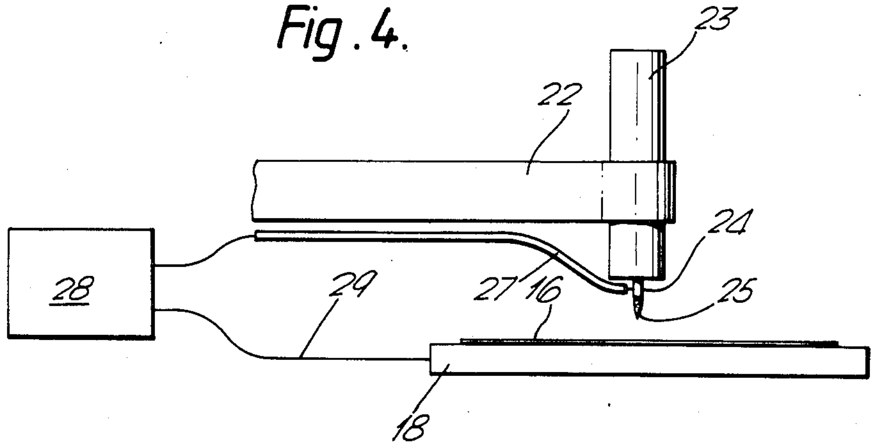
Figure 5:
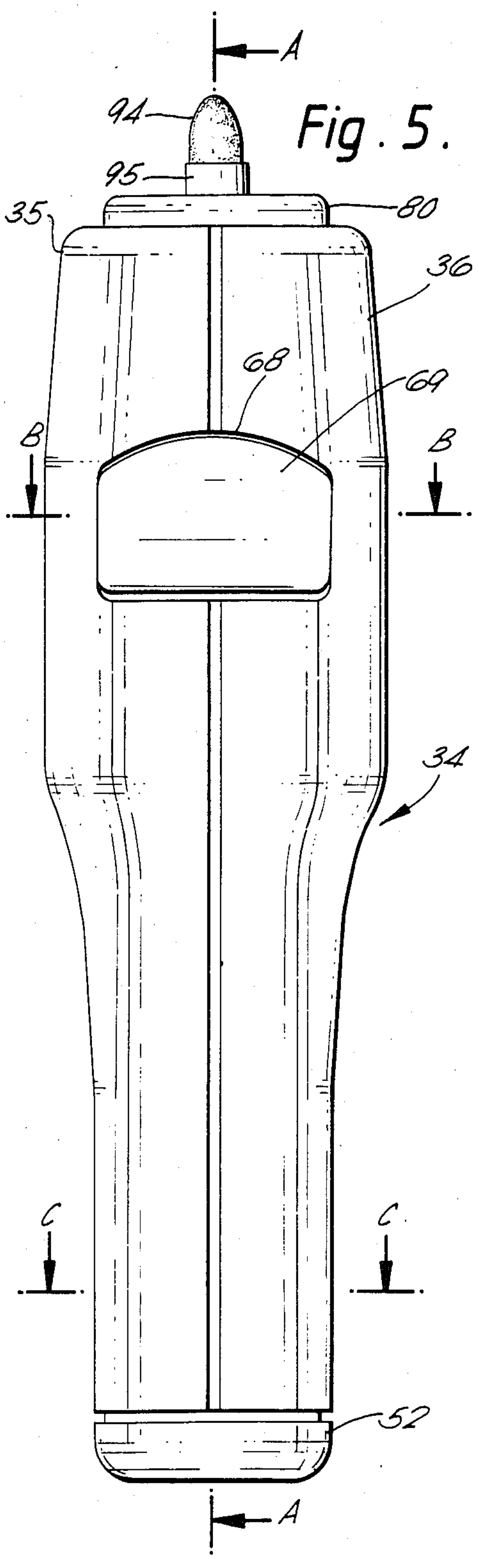
Figure 7:
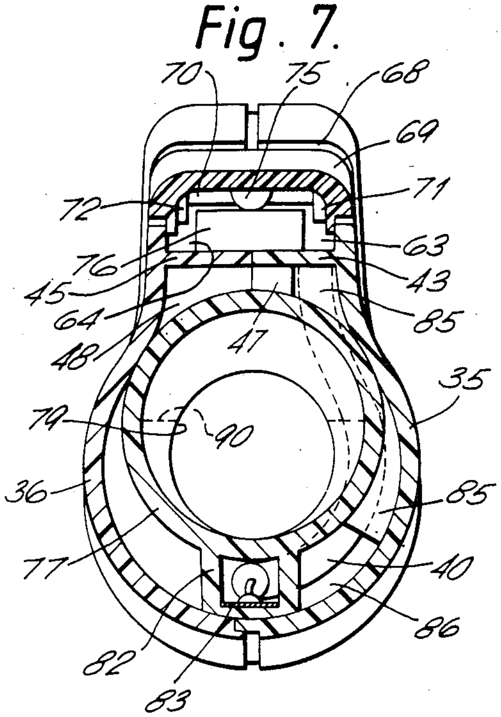
Figure 8:
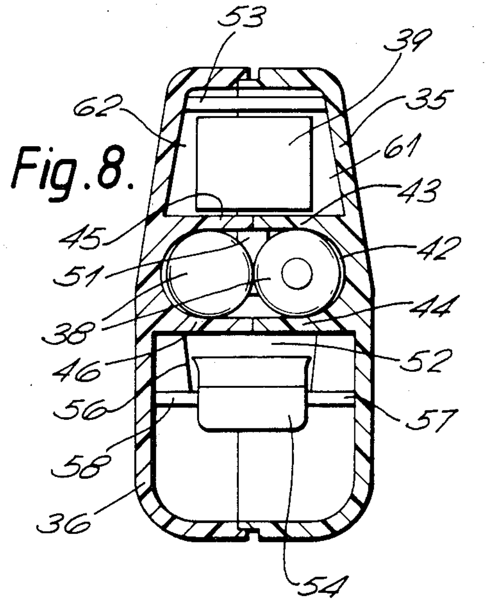
Figure 6:
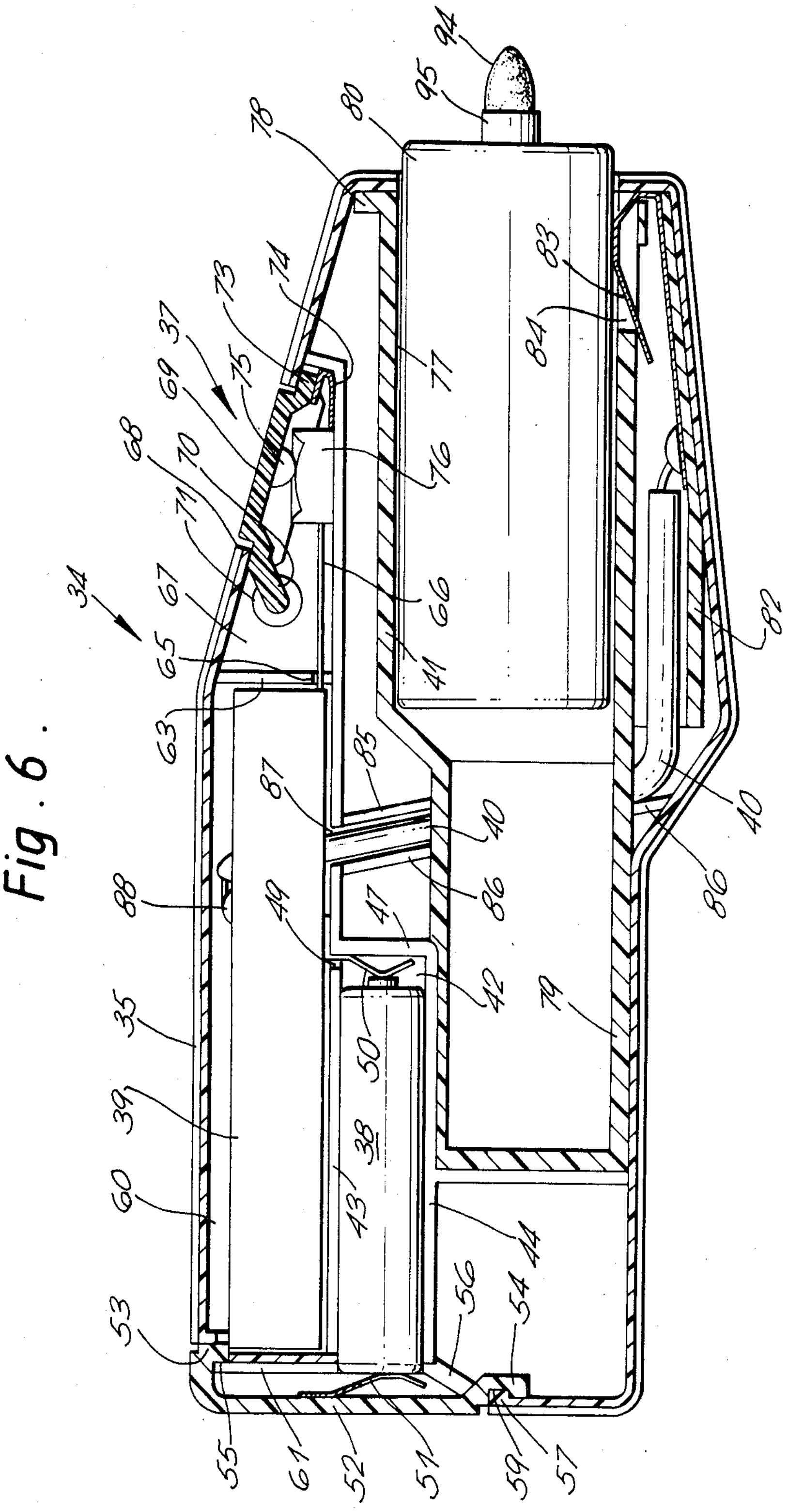
Figure 9:
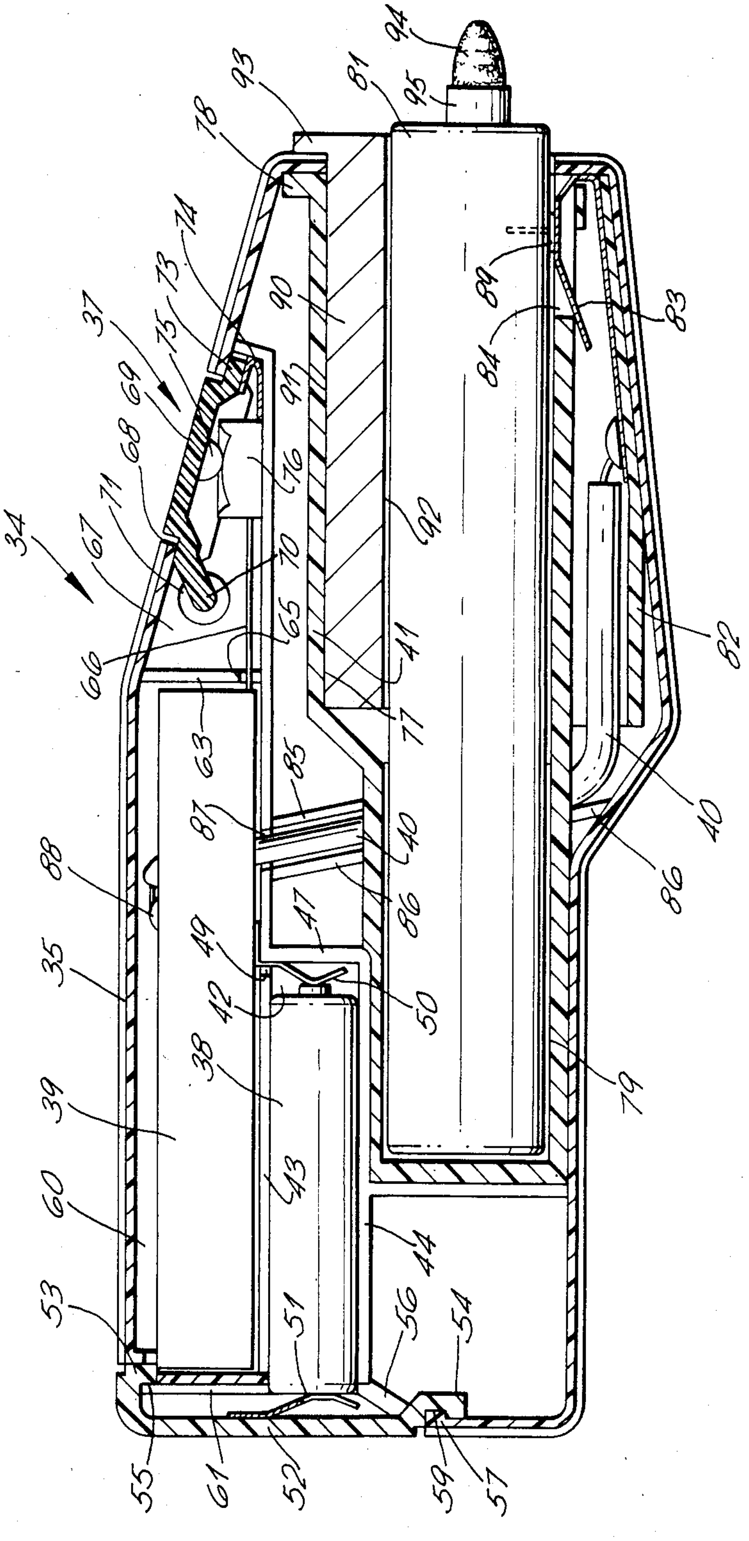

FIG. 1 is a perspective view of one form of the apparatus in accordance with the invention in use, FIG. 2 is a circuit diagram of the high voltage generator used in the apparatus of FIG. 1, FIG. 3 is a diagrammatic plan of another embodiment of the apparatus of the invention, FIG. 4 is a diagrammatic side elevation of part of the apparatus of FIG. 3, FIG. 5 is a plan view of a preferred embodiment of a hand-held apparatus wherein the liquid reservoir and nozzle comprise a demountable cartridge unit, FIG. 6 is a section along the line A—A of FIG. 5, FIG. 7 is a section along the line B—B of FIG. 5 with the cartridge removed, FIG. 8 is a section along the line C—C of FIG. 5, FIG. 9 is a section corresponding to FIG. 6 with an alternative cartridge fitted, together with a suitable adaptor.

In FIG. 1 there is shown a flat drawing board 1 having a metallised surface layer 2 on which the workpiece 3, e.g. a sheet of paper, is resting. At the right hand side of board 1 is a housing 4 containing batteries and a battery powered high voltage generator. The generator circuit is shown in FIG. 2 and consists of a solid state switching device 5 powered by batteries 6 via an on/off switch 7 mounted on housing 4. The switching device 5 produces pulses which are fed to the primary 8 of a transformer. High voltage pulses are thus produced in the secondary winding 9 of the transformer and are rectified by rectifier 10 and fed to capacitor 11. (Capacitor 11 can in some cases be omitted as described hereinafter). One terminal, Vo, of the generator is connected to the metallised surface 2 of board 1 while the other terminal, V+, is connected to an output socket 12 on housing 4.

Typically the generator is arranged to give an output voltage ranging between 5 and 20 kV at load currents up to 200 nA. and a maximum power output of less than 10 mW.

The applicator 13 consists of a conventional fibre-bundle tip graphic marker having a body made of an insulated plastics material with the fibre tip 14 protruding from one end. An insulated flexible electrical lead 15 is connected to a stud at the other end of the marker extending through the body of the marker to contact the conventional wadding type ink reservoir and thus provide an electrical connection, by conduction through the ink, to the fibre-tip 14.

In use lead 15 is plugged into socket 12. Provided the capacitance given by lead 15 is sufficient, capacitor 11 can be omitted from the high voltage generator.

In the embodiment of FIGS. 3 and 4 a computer graphics printer arrangement is shown.

The substrate 16, e.g. paper, is fed from a roll 17 over a metal plate 18. The paper is advanced over plate 18 by rollers 19 driven by a motor 20 controlled by signals from a control unit 21, e.g. a computer.

Positioned above plate 18 is an arm 22 carrying a cartridge 23 in the form of a fibre-tip marker having a spirit ink reservoir and a nozzle consisting of a metal sleeve 24 with a fibre tip 25 projecting therefrom. Arm 22 can be moved transversely to the direction of movement of the paper by an actuator 26 controlled by signals from control unit 21.

A high potential is applied to sleeve 24 via a lead 27 carried by arm 22 from a high voltage generator 28. The return, i.e. "earth", connection 29 from generator 28 is connected to plate 18. If desired the magnitude and/or duration of the high potential applied to sleeve 24 can be varied by signals along line 30 from control unit 21 to generator 28.

If desired actuator 26 can move arm 22 up and down relative to plate 18 to vary the height of the fibre tip 25 from the paper 16.

In the embodiment of FIGS. 5 to 9, the apparatus is self contained and employs a cartridge unit for the liquid reservoir, nozzle and wick. The cartridge is conveniently a felt-tipped marker. The apparatus of this embodiment is designed to accommodate, with the use of an adaptor, cartridges of different shapes and/or sizes.

The apparatus comprises a body 34 constructed from two shell mouldings 35, 36 formed from an electrically insulating plastics material. These mouldings may be held together by any suitable means, for example adhesive along the mating surfaces.

Within the shell formed by mouldings 35, 36, interior partitions define housings for a switch assembly 37, batteries 38, a high voltage generator 39 and a high voltage lead 40 therefrom. Also mounted within the shell is a cartridge housing 41.

The generator 39 is powered, via switch assembly 37, from two 1.5 V dry batteries 38 located within a housing 42. The top and bottom of housing 42 are formed by partitions 43, 44 and 45, 46 integral with mouldings 35 and 36 respectively. The front end of the housing is likewise formed by partitions 47, 48 integral with mouldings 35, 36.

Adjacent the front end of the battery housing 42 are a pair of spring metal contact strips which project through slots 49 in the partions 43, 45 forming the top of the battery housing 42. One of these contact strips is designated by the reference numeral 50 in FIG. 6.

The batteries are held in place, and connected in series, by a spring metal contact strip 51 at the rear of the battery housing 42. This contact strip 51 is mounted on a cover plate 52 moulded from an electrically insulating plastics material.

Cover plate 52 is provided with lugs 53, 54 at its upper and lower ends. These lugs engage, through upper and lower slots 55, 56 in the shell mouldings, with the shell mouldings to hold cover plate 52 in position. The shell mouldings 35, 36 are provided with ribs 57, 58 adjacent the lower edge of the lower slot 56. A recess 59 in the lower lug 54 of the cover plate 52 engages with ribs 57, 58.

Cover plate 52 can be removed, for changing the batteries 38, by pressing inwards against the spring pressure of contact 51, to disengage recess 59 of lug 54 from the ribs 57, 58 and then sliding the cover plate 52 upwards to disengage lug 53 from the upper slot 55.

The generator 39 is of the type shown in FIG. 2 and is located within an enclosure 60 between the top of shells 35, 36 and the partitions 43, 45 thereof forming the top of the battery enclosure 42. The rear of the generator enclosure 60 is formed by the ends 61, 62 of the shell mouldings 35, 36 respectively while the front is formed by partions 63, 64 integral with mouldings 35, 36 respectively.

Slots 65 are provided in partitions 63, 64 to allow two rigid leads 66 from the generator 39 to pass through the partitions 63, 64 to the switch enclosure 67.

The battery spring contact 50 is connected directly through slot 49 to generator 39 while the other battery spring contact (not shown) at the front of the battery housing 42 connects with one of the rigid leads 66 projecting through slots 65.

The switch enclosure 67 is formed by partitions 43, 45 and 63, 64, and the front upper portion of shell mouldings 35, 36. An opening 68 is provided in mouldings 35, 36 into which projects a button 69 moulded from an electrically conductive plastics material. Button 69 is pivotally mounted, by means of an integral lug 70, in bosses 71, 72 integral with mouldings 35, 36. The front end of button 69 bears a lug 73 which is urged against the underside of the front upper portion of mouldings 35, 36 adjacent opening 68 by a spring metal contact strip 74. Button 69 also carries on its underside an integrally formed projection 75 which bears against a non-latching push-to-make switch 76.

Switch 76 is supported by rigid leads 66. One of these leads also connects to contact 74. On closing switch 76 by pressing button 69, the electrical connection from batteries 38 to generator 39 is completed, thus providing power to the generator.

Mounted within the shell mouldings 35, 36 is a cartridge housing 41 moulded from an electrically insulating plastics material. Housing 41 comprises a first hollow cylindrical portion 77 provided at its front end with a flange 78 which abuts the interior front end of shell mouldings 35, 36, and a second hollow cylindrical portion 79 of reduced diameter forming a rearward extension of the first cylindrical portion 77. The first cylindrical portion 77 is of such internal dimensions that it can receive a cylindrical cartridge 80, of short, squat, configuration with one end of the cartridge projecting from the front of the shell mouldings 35, 36.

As is shown in FIG. 9, the second cylindrical portion 79 is of such internal dimensions that it can receive a longer cartridge 81 of reduced cross-section.

Housing 41 also has an integrally formed sleeve 82 in which a spring metal contact strip 83 is mounted, soldered to the end of the high voltage lead 40 from generator 39. The contact strip 83 projects through a slot 84 in the base of the first cylindrical portion 77 of housing 41 to contact the casing of the cartridge 80 inserted therein.

High voltage lead 40 is led, from contact strip 83, behind the rear of the first cylindrical portion 77 of housing 41, round the outside of the second cylindrical portion 79 of housing 41, between partitions 85, 86 integrally formed in shell moulding 35, into the generator enclosure 60 through a slot 87 in partition 43. The high voltage lead 40 connects to the high voltage generator at the high voltage output terminal 88 on the top of generator 39. Part of the path of lead 40 is shown dotted in FIG. 7.

In the arrangement shown in FIGS. 5 and 6 the cartridge 80 has a metal casing. In the embodiment of FIG. 9 however the cartridge 81 has a casing of a non-conducting plastics material. In order to make electrical contact with the liquid in cartridge 81, a metal drawing pin 89 is pressed through the cartridge walls at such a position that the lead of pin 89 will contact the contact strip 83.

When using the longer, thinner, cartridge 81, in order to hold it in position an adaptor 90 is employed. (This adaptor is shown dotted in FIG. 7). The adaptor 90 has an upper surface 91 shaped to fit within the first cylindrical portion 77 of housing 41, a lower surface 92 corresponding to that of the second cylindrical portion 79 of housing 41, and a flange 93 at the front to abut against the front of shell mouldings 35, 36.

The cartridges 80, 81 are of the type having a felt- or fibre-tip 94 projecting from a support 95 at one end of the cartridge. Normally the casing of the cartridge encloses a wad or strip of porous material impregnated with liquid.

In use, a cartridge containing the liquid to be dispensed in inserted in housing 41, if necessary with an adaptor and/or a contact through the cartridge casing, and then button 69 is depressed. This causes a high potential to be applied from generator 39, via high voltage lead 40 to contact strip 83 and hence to the nozzle 94 via conduction through or over the cartridge casing.

When positioned sufficiently close to an earthed surface, the liquid in the cartridge is drawn away from the felt- or fibre-tip nozzle 94 as a ligament which, if the tip/earthed surface distance is sufficient atomises into a spray of fine, electrically charged droplets. The return path to the generator is formed by conduction through the user contacting button 69, which, being electrically conductive, provides a connection from earth, via the user, to spring contact 74 and hence, via switch 76, to the generator.

In the following Examples 1 to 13, apparatus of the type shown in FIGS. 5–9 was employed. The body member, which could be held between the thumb and forefinger, with the latter resting on button 69, had a total length of about 14 cm, a maximum height of 63 mm and a maximum width of 39 mm.

EXAMPLE 1

A standard "Magic Marker" (RTM) felt-tip marker from the Studio Colours range (colour A 310 cadmium red) was fitted into the body member as shown in FIG. 6. The marker had a metal cap which contacted contact strip 83. The felt-tip on the marker as supplied had a chisel configuration 3 mm thick and 6 mm deep. The generator, which produced high voltage pulses at a frequency of about 20–25 Hz, provided a voltage of about 12 kV at the tip when the button 69 was depressed.

With the tip held at distances 2, 3 and 4 cm above a piece of paper resting on a wooden desk, ink sprayed from the nozzle.

EXAMPLE 2

Example 1 was repeated but replacing the standard felt-tip by a cylindrical polyester fibre-bundle tip of 3.7 mm diameter with its end shaped to the bullet-head configuration shown in FIGS. 5, 6 and 29. When held with the tip 2, 3 and 4 cm above the paper, on pressing button 69 a more intense spray was obtained than in Example 1.

EXAMPLE 3

Example 2 was repeated with the addition of 1 ml of xylene to the wadding inside the marker to dilute the ink therein. This ink dilution increased the flow rate and the spray intensity.

EXAMPLE 4

Example 2 was repeated with similar results, using the following studio Colour range "Magic Markers" fitted with the bullet head tips:

Fuschia: A 348
Forest Green: A 600
Cobalt Blue: A 455
Africano: A 262
Cadmium Yellow: A 704

EXAMPLE 5

To assess the effect of varying the voltage, and to measure the spray current, the generator in the applicator was disconnected and a high voltage applied to contact strip 83 via a flexible high voltage lead from a remote variable voltage generator. The other terminal of the generator was earthed. To measure the current, the tip was positioned above a metal plate connected to earth via a digital meter.

Example 3 was repeated with the tip at 3.5 cm from the plate. At an applied voltage of 12 kV the current was 19 nA while at 15 kV the current was 60 nA. With 15 kV applied voltage the tip was gradually moved away from the plate. A spray was still obtained with the tip 9 cm from the plate. With an applied voltage of 9.5 kV good sprays were obtained with the tip between 1 and 7 cm from the plate.

EXAMPLE 6

Example 1 was repeated using a standard "Pantone" (RTM) felt-tip pen type "Warm Red M" in place of the "Magic Marker": in this case adaptor 90 was employed. The pen had a plastic body and a chisel-edge felt-tip of 6 mm width.

Using a generator applying 11.8 kV to strip 83, the voltage at the tip was only 6.2 kV. Only a very faint spray was found with the tip held at 2 cm from the paper but the intensity increased at the tip was brought closer (to within 1 cm of the paper).

EXAMPLE 7

Example 6 was repeated but, to improve the conduction of the high voltage from strip 83 to the felt-tip, a metal drawing pin was pressed through the pen casing at the position of contact 83. In this case the voltage at the tip was 11.5 kV. The spray intensity was greater than in Example 6.

EXAMPLE 8

Example 7 was repeated but with the felt-tip replaced by a polyester fibre bundle bullet-head tip of diameter 4.8 mm and using a generator producing 14 kV at strip 83 (13.9 kV at the felt-tip). A more intense spray was obtained than in Example 7.

EXAMPLE 9

Example 6 was repeated using the felt-tip used in Example 8 and adding 1.5 ml of xylene to the cartridge contents.

Good spraying was obtained at distances up to 7 cm from the paper.

EXAMPLE 10

Example 1 was repeated using a standard "Textmark" (RTM) 700 blue ink marker. As in Example 6 an adaptor was employed to hold the marker in position. The marker had a metal casing and a bullet-head configuration tip formed of an acrylic fibre bundle of about 4 mm diameter.

With an applied voltage of 14 kV, satisfactory spraying was obtained at distances of 2, 3 and 4 cm from the paper.

EXAMPLE 11

Example 5 was repeated using the marker of Example 10 with the tip at varying distances from the plate. The measured current was as follows:

| Distance from paper (cm) | Voltage (kV) | Current (nA) |
|---|---|---|
| 5 | 10 | 84 |
| 10 | 10 | 50 |
| 15 | 10 | 9 |
| 5 | 15 | 3000 |
| 10 | 15 | 1080 |
| 15 | 15 | 350 |

Under all the conditions quoted, satisfactory spraying occurred.

All the markers employed in Examples 1 to 11 could be used conventionally by moving the tip in contact with paper.

EXAMPLE 12

An empty "Magic Marker" type 79 in which the tip supplied has been sharpened to a point was charged with an alcohol based aftershave. When fitted to the applicator body provided with a generator producing high voltage pulses at a frequency of about 20–25 Hz, giving a voltage of about 12 kV at the tip, a spray could be dispensed into the atmosphere. The user's finger on button 69 acted as a field intensifying electrode to permit spraying even though no other earthed surface was within 50 cm of the tip.

Aftershave could also be deposited on the user's chin by holding the tip a few cm from the chin, or by moving the tip over the skin while in contact therewith.

EXAMPLE 13

An empty "Magic Marker" of the type used in Example 12 was charged with a vegetable oil based pesticide. When fitted to the applicator body as in Example 12, a pesticide spray could be dispensed on to houseplants when held within 10 cm of the plant. The pesticide could also be dispensed by wiping the tip on the houseplant leaves.

All the cartridges of Examples 1 to 13 were such that no liquid was dispensed when no high potential was applied and the tip was not in contact with a receptive surface such as paper.

EXAMPLE 14

In a series of experiments using apparatus similar to that illustrated in FIGS. 3 and 4, marks or traces were made on paper with different colour fibre-tip markers, at various applied voltages, and tip/paper spacings.

The fibre-tip markers were "Textmark" 700 pocket pen markers having fibre tips having a 6 mm long bullethead shaped end and a maximum diameter of 4 mm. Since these pens have a metal case with the fibre tip mounted in a plastics moulding screwed on to the end of the case, the lead 27 was attached to the metal case rather than to the nozzle itself.

The results are shown in the following table.

| Pen | Tip/paper spacing (mm) | Voltage (kV) | Current (nA) | Trace width | Trace intensity |
|---|---|---|---|---|---|
| Red | 2 | 5 | 10 | fine | dark |
| | 25 | 9 | 10 | broad | medium |
| Green | 2 | 4 | 2 | fine* | dark |
| | 2 | 4.5 | — | fine | dark |
| | 2 | 5 | — | fine | dark |
| | 25 | 8 | 5 | broad | feeble |
| | 25 | 9 | 10 | broad | feeble |
| | 25 | 10 | 20 | broad | dark |
| | 25 | 11 | 500 | broad | dark but "gritty" texture |
| Yellow | 2 | 5 | — | fine* | dark |
| | 2 | 5.5 | 3 | fine | dark |
| | 25 | 9 | 2 | broad | medium |
| Black | 2 | 4 | 20 | fine | medium |
| | 2 | 5 | 700 | fine | medium |
| | 25 | 10 | 70 | broad | feeble |
| | 25 | 12 | 2100 | broad | dark |

The "fine" traces were below approximately 0.3 mm in width while the "broad" traces were approximately 3 mm (yellow) to 6 mm (green) in width. When there was no relative movement during spraying with the tip/paper spacing of 25 mm, circular marks of about 5 mm (yellow) to 10 mm (red) were produced that did not increase in size, but increased in intensity, as the duration of the spray increased from 1 second to 5 seconds.

EXAMPLE 15

In this example a computer graphics plotter model 1342 made by Benson Electronics Limited was employed.

In this plotter a carriage carrying an applicator is moveable, in response to signals from a control unit, along the length of a roller over which paper, forming the substrate, passes. Movement of the paper longitudinally is effected mechanically in response to signals from the control unit. The carriage movement is thus transverse to the paper. The normal applicator in this plotter is a rolling-ball type graphic marker and on/off action is achieved by moving the tip of the marker, in response to signals from the control unit, into and out of contact with the paper.

In the example the normal rolling ball-type marker was replaced by a "Textmark" 700 fibre-tip marker as used in Example 14 but held with the tip 8 mm above the paper. Since in this plotter the roller beneath the paper over which the carriage moves is made of a nonconductive plastics material, a fine wire "brush" was attached to the carriage so that it contacted the surface of the paper at a distance of about 50 mm from the marker tip.

A control electrode in the form of a wire ring was disposed 3 mm above the paper surface concentric with the marker tip.

A voltage of about +5 kV, relative to earth was applied to the metal casing of the marker and the brush was earthed. The on/off signals to the carriage were used to switch off and on a voltage of about +1.9 kV, relative to earth, to the control electrode instead of moving the applicator into and out of contact with the paper. Marks were made on the substrate while the voltage on the control electrode was off and no marks were made while 1.9 kV was applied to the control electrode. When used to reproduce engineering drawings in response to a program supplied to the control unit, high quality drawings were obtained using a variety of "Textmark" pens of differing colours (red, green, brown, blue).

We claim:

1. Apparatus for dispensing a liquid comprising (i) a nozzle having a porous wick extending therefrom, (ii) a liquid supply to said wick, (iii) means to support said nozzle, and (iv) means to apply to said wick a sufficiently large electrical potential, relative to earth, that, when the tip of said wick positioned at a distance within the range 5 to 20 mm from an earthed surface, sufficient electrical gradient is provided at the tip of said wick to draw a ligament of said liquid away from said wick.

2. Apparatus according to claim 1 including a body and said liquid supply comprises a reservoir of said liquid within said body, said reservoir being demountable from said body.

3. Apparatus according to claim 2 wherein the reservoir, nozzle and wick comprise a single cartridge unit which can be removed from the body.

4. Apparatus according to claim 3 wherein said cartridge unit is a graphic marking implement.

5. Apparatus according to claim 2 wherein the body is elongated and shaped so as to be suitable for holding in the human hand with the wick at one end of said body.

6. Apparatus according to claim 5 wherein a high voltage generator is mounted within the body.

7. Apparatus according to claim 6 wherein the outer surface of said body is provided with an electrically conductive portion electrically connected to the high voltage generator thereby providing an earth return to said generator when said electrically conductive portion is contacted by the hand of the user.

8. Apparatus according to claim 7 wherein the high voltage generator is powered by at least one battery provided within said body.

9. Apparatus according to claim 7 wherein said electrically conductive portion comprises a push button which, when depressed, causes a high potential, relative to earth, to be generated by said generator.

10. Apparatus according to claim 1 for printing on a sheetlike substrate wherein the tip of the wick is spaced from the substrate, including (a) means for effecting relative movement between said nozzle and said substrate in a plane perpendicular to the perpendicular from said nozzle to said substrate in response to a signal or signals from a control unit, (b) an electrically conductive member spaced from the tip of said wick and contacting said substrate.

11. Apparatus according to claim 10 including means to vary the potential applied to the wick in response to a signal from the control unit.

12. Apparatus according to claim 10 including a control electrode disposed adjacent to, but spaced from, the wick, means to apply a high potential, relative to said conductive member, to said control electrode, and means to vary the potential applied to said control electrode in response to a signal from the control unit.

13. Apparatus according to claim 10 including means to vary the spacing of the tip of the wick from said substrate in response to a signal from the control unit.

14. Apparatus according to claim 10 including a plurality of applicators and means, controlled by said control unit, to determine the applicator to be actuated.

15. Apparatus for use in the dispensing of a liquid from a cartridge having a casing enclosing a reservoir of the liquid and a nozzle having a porous wick extending therefrom, comprising (i) a body, adapted to receive said cartridge with the tip of the wick projecting therefrom, and (iii) means to apply a sufficiently large electrical potential, relative to earth, to said cartridge, when said cartridge is fitted to said body that, when the tip of said wick is positioned at a distance within the range 5 to 50 mm from an earthed surface, sufficient electrical gradient is provided at the tip of said wick to draw a ligament of said liquid away from said wick.

16. Apparatus according to claim 15 wherein the body is elongated and is shaped so as to be suitable for holding in the human hand with the wick at one end of said body.

17. Apparatus according to claim 16 wherein a high voltage generator is mounted within the body.

18. Apparatus according to claim 17 wherein the outer surface of said body is provided with an electrically conductive portion electrically connected to the high voltage generator thereby providing an earth return to said generator when said electrically conductive portion is contacted by the hand of the user.

19. Apparatus according to claim 18 wherein the high voltage generator is powered by at least one battery provided within said body.

20. Apparatus according to claim 18 wherein said electrically conductive portion comprises a push button which, when depressed, causes a high potential, relative to earth, to be generated by said generator.

21. An electrostatic graphic art liquid applicator comprising: a nozzle having a porous wick extending therefrom, said wick having a cross-sectional area of between about 1.0 square cm and 0.02 square cm and a tip of convex shape; means for supplying liquid to said wick; and means to apply to said wick a sufficiently large electric potential, relative to earth, that when the tip of said wick is positioned at a distance of 5–20 mm from an earthed surface, sufficient electrical gradient is provided at the tip to draw a ligament of said liquid from said wick toward the earthed surface.

* * * * *